(12) United States Patent
Gaur

(10) Patent No.: US 8,396,107 B2
(45) Date of Patent: Mar. 12, 2013

(54) GENERALIZED DECISION FEEDBACK EQUALIZER PRECODER WITH RECEIVER BEAMFORMING FOR MATRIX CALCULATIONS IN MULTI-USER MULTIPLE-INPUT MULTIPLE-OUTPUT WIRELESS TRANSMISSION SYSTEMS

(75) Inventor: Sudhanshu Gaur, Campbell, CA (US)

(73) Assignee: Hitachi Ltd., Tokyo (JP)

( * ) Notice: Subject to any disclaimer, the term of this patent is extended or adjusted under 35 U.S.C. 154(b) by 836 days.

(21) Appl. No.: 12/554,082

(22) Filed: Sep. 4, 2009

(65) Prior Publication Data

US 2011/0058599 A1 Mar. 10, 2011

(51) Int. Cl.
*H03H 7/30* (2006.01)
*H03H 7/40* (2006.01)
*H03K 5/159* (2006.01)

(52) U.S. Cl. .................................................. 375/232

(58) Field of Classification Search .............. 375/232, 375/233
See application file for complete search history.

(56) References Cited

FOREIGN PATENT DOCUMENTS

| EP | 2 228 956 A2 | 9/2010 |
|---|---|---|
| WO | 2009/057876 A1 | 5/2009 |

OTHER PUBLICATIONS

Q. Spencer et al., "Zero-Forcing Methods for Downlink Spatial Multiplexing in Multiuser MIMO Channels", IEEE Transactions on Signal Processing, vol. 52, No. 2, pp. 461-471, Feb. 2004.
C. Windpassinger et al., "Precoding in Multi-Antenna and Multi-User Communications", IEEE Transactions on Wireless Communications, pp. 1305-1316, Jul. 2004.
W. Yu, "Competition and Cooperation in Multi-User Communication Environments", PhD Dissertation, 128 pages, Jun. 2002.
W. Yu et al., "Sum Capacity of Gaussian Vector Broadcast Channels", IEEE Transactions on Information Theory, vol. 50, No. 9, pp. 1875-1892, Sep. 2004.
X. Shao et al., "Precoder Design for MIMO Broadcast Channels", IEEE International Conference on Communications (ICC), pp. 788-794, May 2005.
N. Jindal et al., "Sum Power Iterative Water-Filling for Multi-Antenna Gaussian Broadcast Channels", IEEE Transactions on Information Theory, vol. 51, No. 4, pp. 1570-1580, Apr. 2005.
W. Yu, "The Structure of Least-Favorable Noise in Gaussian Vector Broadcast Channels", Advances in Network Information Theory, DIMACS Series in Discrete Mathematics and Theoretical Computer Science, vol. 66, pp. 159-171, Mar. 2003.
G. Munz et al., "An Efficient Waterfilling Algorithm for Multiple Access OFDM", IEEE Global Telecommunications Conference 2002, 5 pages, Nov. 2002.
Gaur, "A Practical Algorithm for Realizing GDFE Precoder for Multiuser MIMO Systems", IEEE International Conference, May 23, 2010, 5 pp.
Sadrabadi et al., "A New Method of Channel Feedback Quantization for High Data rate MIMO Systems", IEEE Communications Society, Nov. 29, 2004, pp. 91-95.

*Primary Examiner* — David C. Payne
*Assistant Examiner* — Tanmay Shah
(74) *Attorney, Agent, or Firm* — Mattingly & Malur, P.C.

(57) ABSTRACT

To realize a GDFE precoder for multi-user MIMO systems, which significantly reduces the computational cost while resulting in no capacity loss, one method comprises obtaining an effective downlink (DL) channel matrix H for the DL channel after receiver processing at the user terminals; computing an uplink (UL) covariance matrix D by assuming there are as many user terminals as a number of rows in the effective DL channel matrix H; computing a filter matrix C based on the UL covariance matrix D; computing a feedforward filter matrix F based on the filter matrix C; computing an interference pre-cancellation matrix G, based on the feedforward filter matrix F and the filter matrix C, used in a transmitter at an interference pre-cancellation stage of the GDFE precoder; and processing user symbols by a decision feedback equalizing stage of the GDFE precoder to produce filtered vector symbols.

20 Claims, 6 Drawing Sheets

US 8,396,107 B2

GENERALIZED DECISION FEEDBACK EQUALIZER PRECODER WITH RECEIVER BEAMFORMING FOR MATRIX CALCULATIONS IN MULTI-USER MULTIPLE-INPUT MULTIPLE-OUTPUT WIRELESS TRANSMISSION SYSTEMS

RELATED APPLICATIONS

The present application is related to U.S. patent application Ser. No. 12/401,711, filed Mar. 11, 2009, and concurrently filed U.S. patent application Ser. No. 12/554,069 (GENERALIZED DECISION FEEDBACK EQUALIZER PRECODER WITH INPUT COVARIANCE MATRIX CALCULATION FOR MULTI-USER MULTIPLE-INPUT MULTIPLE-OUTPUT WIRELESS TRANSMISSION SYSTEMS), the entire disclosures of which are incorporated herein by reference.

BACKGROUND OF THE INVENTION

The present invention relates generally to multiple-input multiple-output (MIMO) communications systems and, more particularly, to Generalized Decision Feedback Equalizer (GDFE) based precoder configuration in MIMO systems and matrix calculations with receiver beamforming.

It is well known that a Generalized Decision Feedback Equalizer (GDFE) based precoder provides the optimal capacity solution for Multi-user Multiple-Input Multiple-Output (MU-MIMO) wireless systems. However, the computational cost of determining various filters associated with the GDFE precoder is often prohibitive and is not suitable for many practical systems.

There are several known preceding techniques which can enable a Base Station (BS) equipped with multiple antennas to send simultaneous data streams to multiple user terminals (UTs) in order to optimize system capacity. In general, preceding for a MU-MIMO system aims to optimize a certain criterion such as system capacity or bit error rate. Selected references are noted below, together with a description of relevant aspects of the techniques proposed therein.

Q. H Spencer, A. L. Swindlehurst, and M. Haardt, "Zero-forcing methods for downlink spatial multiplexing in multi-user MIMO channels", IEEE Transactions on Signal Processing, pp. 461-471, February 2004 [1] describes a linear precoding technique, known as Block Diagonalization (BD), which separates out the data streams to different UTs by ensuring that interference spans the Null Space of the victim UT's channel. The BD technique diagonalizes the effective channel matrix so as to create multiple isolated MIMO subchannels between the BS and the UTs. Although this scheme is simple to implement, it limits system capacity somewhat.

C. Windpassinger, R. F. H Fischer, T. Vencel, and J. B Huber, "Precoding in multi-antenna and multi-user communications", IEEE Transactions on Wireless Communications, pp. 1305-1316, July 2004 [2] describes a non-linear precoding scheme known as Tomlinson-Harashima Precoding (TIP). This scheme relies on successive interference pre-cancellation at the BS. A modulo operation is used to ensure that transmit power is not exceeded. Different from BD and other linear techniques, THP triangularizes the effective channel matrix and provides somewhat higher system capacity when compared to BD and the like. However, it still does not provide the optimal system capacity.

In W. Yu, "Competition and Cooperation in Multi-User Communication Environments", PhD Dissertation, Stanford University, February 2002 [3] and W. Yu and J. Cioffi, "Sum capacity of Gaussian vector broadcast channels", IEEE Transactions on Information Theory, pp. 1875-1892, September 2004 [4], Wei Yu introduced the GDFE precoder and showed that it achieves a high degree of system capacity. The basic components of this scheme are illustrated in FIG. 1. The GDFE precoder includes an interference pre-cancellation block 101. Similar to the THP preceding scheme discussed in reference [2] above, the interference pre-cancellation helps to ensure that the symbol vector encoded at the $k^{th}$ step will suffer from the interference from (k−1) symbol vectors only. Information symbols u are processed by the interference pre-cancellation block 101 to produce filtered vector symbols x.

The filtered vector symbols x are then passed through a transmit filter 103 denoted by matrix B to produce transmitted signals y. In reference [3] and [4], a technique based on the covariance matrix ($S_{zz}$) corresponding to "Least Favorable Noise" is proposed to compute the GDFE precoder components. Although, this technique achieves a high degree of system capacity, the computational cost of determining the GDFE precoder components is effectively prohibitive for a real-time implementation required by most practical systems.

X. Shao, J. Yuan and P. Rapajic, "Precoder design for MIMO broadcast channels", IEEE International Conference on Communications (ICC), pp. 788-794, May 2005 [5] proposes a different preceding technique which achieves a capacity close to the theoretical maximum system capacity. The proposed method is computationally less complex compared to the GDFE precoder technique. However, the proposed method allocates equal power to all data streams, which may not be an effective technique for practical systems using a finite number of quantized bit-rates. Also, the proposed technique is limited to invertible channel matrices, which may not always be the case.

N. Jindal, W. Rhee, S. Vishwanath, S. A. Jafar, and A. Goldsmith, "Sum Power Iterative Water-filling for Multi-Antenna Gaussian Broadcast Channels", IEEE Transactions on Information Theory, pp. 1570-1580, April 2005 [6] derives a very useful result referred to as the MAC/BC (multiple access channel/broadcast channel) duality; and Wei Yu, DIMACS Series in Discrete Mathematics and Theoretical Computer Science, Vol. 66, "Advances in Network Information Theory," pp. 159-171 [7] develops the concept of least favorable noise.

The entire disclosures of the above references are incorporated herein by reference.

BRIEF SUMMARY OF THE INVENTION

Exemplary embodiments of the invention provide a technique to realize a GDFE precoder for multi-user (MU) MIMO systems, which significantly reduces the computational cost while resulting in no capacity loss. The technique is suitable for improving the performance of various MU-MIMO wireless systems including presently planned future "4G" cellular networks. A computationally efficient framework is presented for determining various filters associated with the GDFE precoder in U.S. patent application Ser. No. 12/401,711. While it overcomes the computation complexity associated with the conventional GDFE precoder by reducing the computational cost without capacity loss, the feedback overhead associated with the GDFE precoder can still remain an issue. This invention focuses on the algorithm for reducing the feedback overhead while maintaining the advantages offered by that GDFE precoder design.

The present invention reduces the feedback overhead associated with the feedforward filter F of the GDFE precoder. This is achieved by conditioning the downlink (DL) channel by means of receiver beamforming. The modified DL channel is then used to compute various matrices associated with the GDFE filter assuming there exists no coordination among any receiver antennas for all users. This forces the feedforward filter F to be strictly diagonal, thus reducing the feedback overhead. Also, the channel conditioning using receiver beamforming ensures that the loss in capacity due to no coordination among receiver antennas is minimal.

An aspect of the present invention is directed to a method for processing user symbols with a generalized decision feedback equalizer (GDFE) based precoder in a base station of a multi-user multiple-input multiple-output (MU-MIMO) wireless system having K user terminals (UTs) which communicate with the base station via an uplink (UL) channel and a corresponding downlink (DL) channel. The method comprises obtaining an effective downlink (DL) channel matrix H for the DL channel after receiver processing at the user terminals; computing an uplink (UL) covariance matrix D by assuming there are as many user terminals as a number of rows in the effective DL channel matrix H, the UL covariance matrix D being a diagonal matrix; computing a filter matrix C based on the UL covariance matrix D; computing a feedforward filter matrix F based on the filter matrix C; computing an interference pre-cancellation matrix G, based on the feedforward filter matrix F and the filter matrix C, used in a transmitter at an interference pre-cancellation stage of the GDFE precoder; and processing user symbols by a decision feedback equalizing stage of the GDFE precoder to produce filtered vector symbols. The effective downlink (DL) channel matrix is $H=[\hat{H}_1^H, \hat{H}_2^H, \ldots, \hat{H}_K^H]$, where $\hat{H}_k$ is an effective DL channel sub-matrix for the $k^{th}$ UT $\hat{H}_k=S_k V_k^H$, where $S_k$ and $V_k$ are matrices obtained from a singular value decomposition (SVD) of an estimated DL channel matrix $H_k$ for the $k^{th}$ UT, $H_k=U_k S_k V_k^H$.

Another aspect of the invention is directed to a generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel. The GDFE precoder comprises a feedforward path; a feedback path; and an interference pre-cancellation block denoted by I-G disposed in the feedback path, I being an identity matrix, G being an interference pre-cancellation matrix. The interference pre-cancellation matrix G is computed based on a feedforward filter matrix F and a filter matrix C, the feedforward filter matrix F is computed based on the filter matrix C, the filter matrix C is computed based on an uplink (UL) covariance matrix D, the UL covariance matrix D is computed by assuming there are as many user terminals as a number of rows in an effective downlink (DL) channel matrix H, the UL covariance matrix D is a diagonal matrix, and the effective DL channel matrix H is obtained after receiver processing at the user terminals. The effective downlink (DL) channel matrix is $H=[\hat{H}_1^H, \hat{H}_2^H, \ldots, \hat{H}_K^H]$, where $\hat{H}_k$ is an effective DL channel sub-matrix for the $k^{th}$ UT, $\hat{H}_k=S_k V_k^H$, where $S_k$ and $V_k$ are matrices obtained from a singular value decomposition (SVD) of an estimated DL channel matrix $H_k$ for the $k^{th}$ UT, $H_k=U_k S_k V_k^H$.

Another aspect of this invention is directed to a generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel. The GDFE precoder comprises a decision feedback equalizing stage for processing user symbols to produce filtered vector symbols, the decision feedback equalizing stage including an interference pre-cancellation stage having an interference pre-cancellation matrix G used in a transmitter at the interference pre-cancellation stage; and a transmit filter represented by a transmit filter matrix B for processing the filtered vector symbols after the decision feedback equalizing stage to produce an output of transmitted signals to be directed to the DL channel represented by the effective DL channel matrix H through which communications occur in the wireless system with the user terminals. The interference pre-cancellation matrix G is computed based on a feedforward filter matrix F and a filter matrix C, the feedforward filter matrix F is computed based on the filter matrix C, the filter matrix C is computed based on an uplink (UL) covariance matrix D, the UL covariance matrix D is computed by assuming there are as many user terminals as a number of rows in an effective downlink (DL) channel matrix H, the UL covariance matrix D is a diagonal matrix, and the effective DL channel matrix H is obtained after receiver processing at the user terminals. The effective downlink (DL) channel matrix is $H=[\hat{H}_1^H, \hat{H}_2^H, \ldots, \hat{H}_K^H]$, where $\hat{H}_k$ is an effective DL channel sub-matrix for the $k^{th}$ UT, $\hat{H}_k=S_k V_k^H$, where $S_k$ and $V_k$ are matrices obtained from a singular value decomposition (SVD) of an estimated DL channel matrix $H_k$ for the $k^{th}$ UT, $H_k=U_k S_k V_k^H$.

These and other features and advantages of the present invention will become apparent to those of ordinary skill in the art in view of the following detailed description of the specific embodiments.

DETAILED DESCRIPTION OF THE INVENTION

Figure 1:
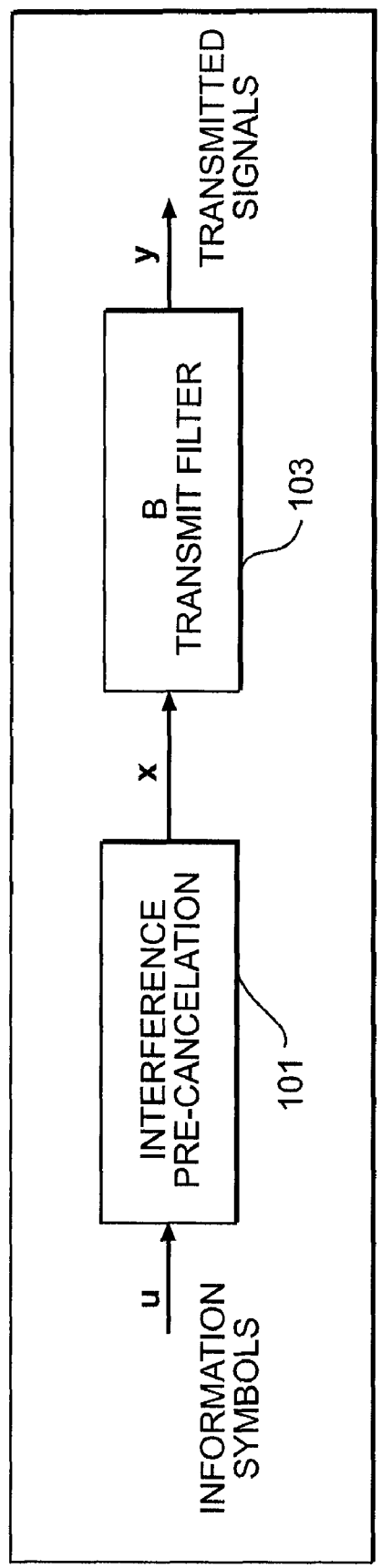
FIG. 1 is a block diagram of a known GDFE precoder.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for GDFE precoder configuration in MIMO systems and matrix calculations with receiver beamforming.

A. System Model

First, the system, model and notations used herein are set forth. Let the base station (BS) have $N_t$ antennas and let there be K user terminals (UTs) with $L_k$ antennas each. The sum of antennas at all UTs is denoted as $L=\Sigma_{k=1}^{K}L_k$. Let $H_k$ denote the channel gain matrix of dimensions $\{L_k \times N_t\}$ between the BS and the $k^{th}$ UT. The combined channel gain matrix between the BS and the K UTs is of dimension $\{L \times N_t\}$ and is given by $H=[H_1^T H_2^T \ldots H_K^T]^T$, where the superscript $T$ denotes the matrix transpose.

Let $u_k$ denote the input symbol vector destined for the $k^{th}$ UT, so that the stacked input vector can be represented as $u=[u_1^T u_2^T \ldots u_K^T]^T$. The length of u is assumed not to exceed the number of antennas at the BS. Also, assume the additional constraint that $S_{uu}=E[uu^H]=I$, where E[.] indicates the time average of its argument, the superscript H denotes the conjugate transpose and I denotes the identity matrix.

A.1 Definitions

Figure 2:
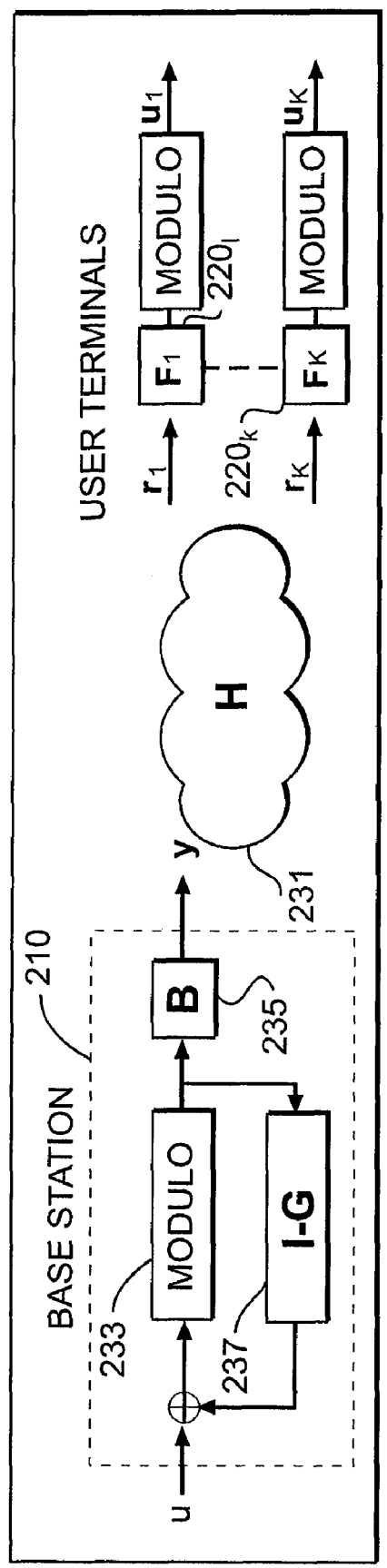
FIG. 2 is a block diagram of a communications system using GDFE preceding.

Referring to FIG. 2, a functional block diagram is shown of a MU-MIMO system having a base station 210 and user terminals 220$_1$-220$_K$. Each user terminal has associated therewith a feedforward filter $F_1$-$F_K$. Communications occur through a channel 231 represented by a channel matrix H. The base station includes a GDFE precoder including a feedforward path and a feedback path. In the feedforward path, a modulo unit 233 produces a stream of filtered vector symbols X, which are filtered by a transmit filter 235 to produce a transmitted signal stream y. In the feedback path, the symbols X are fed back through an interference pre-cancellation block 237, represented by an interference pre-cancellation matrix G subtracted from the identity matrix I. A stream of user symbols u has subtracted therefrom an output signal of the interference pre-cancellation block 237, with the result being applied to the modulo unit 233.

Other aspects/parameters related to this system model are described below:

1). Interference Pre-Cancellation Matrix (G): This matrix is used at the transmitter at Interference Pre-cancellation Stage of the GDFE precoder as shown in FIG. 2. The main purpose of this matrix is to process input symbol vector u for interference pre-cancellation purposes. Its structure is that of an Upper Right Triangular matrix with block diagonal sub-matrices being identity matrices each of size $a_k$.

2). Input Covariance Matrix for Downlink Channel ($S_{xx}$): It is defined as $S_{xx}=E[xx^H]$ and satisfies the transmit power constraint, i.e., trace($S_{xx}$)$\leq P_t$, where $P_t$ denotes the total available transmit power and trace(.) indicates the sum of diagonal elements of the matrix argument. The input covariance matrix for the downlink channel represents dependencies of symbols transmitted from different ones of said $N_t$ transmit antennas; a sum of diagonal matrix elements represents an intended total transmit power from the $N_t$ transmit antennas. In the following text, $S_{xx}$ will be represented using its Eigen Value Decomposition (EVD) as:

$$S_{xx}=V\Sigma V^H \quad (1)$$

where V is a unitary matrix and $\Sigma$ is a diagonal matrix with non-negative entries.

3). Transmit Filter (B): This matrix is used to process the symbol vector x obtained after the DFE stage of GDFE precoder as shown in FIG. 2. It is denoted by the following equation:

$$B=V\Sigma^{1/2}M \quad (2)$$

where M is a unitary matrix and the matrices $\{V, \Sigma\}$ are same as defined in (1).

4). Least Favorable Noise Covariance Matrix ($S_{zz}$): This may be regarded as the noise covariance matrix that results in the minimum system capacity when full coordination among all UTs is assumed. This is a positive definite Hermitian Matrix whose block diagonal sub-matrices are identity matrices of size $a_k$. This is defined in a similar fashion to that shown in Eq. (67) of the Yu and Cioffi reference [4].

5). Input Covariance Matrix for Equivalent Uplink Channel (D): It is defined similar to the Equation (3.6) of reference [7] as the correlation among the symbols of the input vector for the equivalent Uplink/Medium Access Channel (MAC) with channel matrix $H^H$. The structure of matrix D is that of a block diagonal matrix and satisfies the transmit power constraint, i.e., trace(D)$\leq P_t$, where $P_t$ denotes the total available transmit power. Each block diagonal sub-matrix of D represents the input covariance matrix for a particular UT in the Uplink channel. A capacity optimal D can be computed using the methodology presented in reference [6].

A.2 Transmitter Processing

As shown in FIG. 2, the GDFE precoder includes an interference pre-cancellation block denoted by I-G, where G has the structure of a Block Upper Right Triangular matrix. Similar to the THP precoding scheme of reference [2], the triangular structure of the feedback matrix G helps to ensure that the symbol vector encoded at the $k^{th}$ step will suffer from the interference from (k−1) symbol vectors only. The $x_k^{th}$ sub-vector of $x=[x_1^T x_2^T \ldots x_K^T]^T$ is generated using the following relationship:

$$x_k = \left(u_k - \sum_{m=k+1}^{K} G_{km} x_m\right) + \alpha_k \quad (3)$$

where $G_{km}$ denotes the sub-matrix of G required to pre-cancel interference due to the vector symbol $x_m$ from $x_k$. These sub-vectors are generated in the reverse order, with $x_k$ being the first generated vector and $x_1$ being the last one. An example of the structure of the matrix G for a 3 UT scenario is shown below $$G = \begin{bmatrix} I & G_{12} & G_{13} \\ 0 & I & G_{23} \\ 0 & 0 & I \end{bmatrix} \quad (4)$$

In this particular example, $x_3$ is generated first, followed by $x_2$ from which interference due to $x_3$ is pre-subtracted using the sub-matrix $G_{23}$. Lastly, $x_1$ is generated after pre-subtraction of interference due to $x_2$ and $x_3$. Also, each complex element of vector $\alpha_k$ in (3) is chosen from the following set:

$$A = \{2\sqrt{S}(p_1 + jp_Q) | p_1, p_Q \in \{\pm 1, \pm 3, \ldots, \pm(\sqrt{S}-1)\}\} \quad (5)$$

where S is the constellation size.

The elements of $\alpha_k$ are chosen such that the elements of the resulting vector $x_k$ are bounded by the square region of width $2\sqrt{S}$. This mechanism, while allowing for interference pre-cancellation, also limits the total transmit power.

The vector x is then passed through a transmit filter B to yield a vector y given by the following relationship:

$$y = Bx \quad (6)$$

The vector y is transmitted by mapping its element to the respective antenna elements of the Base Station.

B. Receiver Processing

Figure 3:
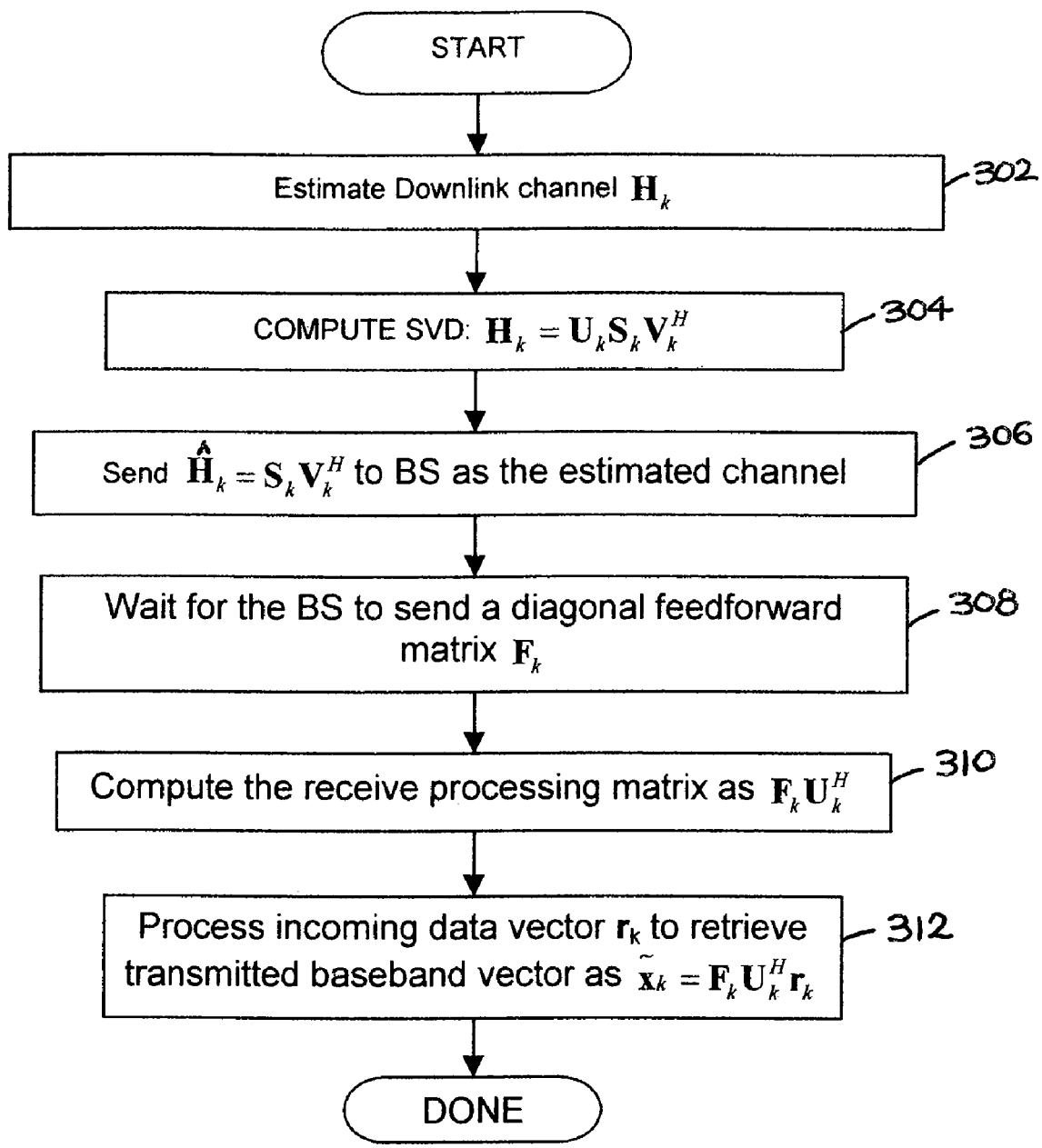
FIG. 3 is a flow diagram of receiver processing according to an embodiment of the invention.

FIG. 3 is a flow diagram of receiver processing. Each UT will determine the corresponding DL channel associated with the BS. Let $H_k$ denote the estimated DL channel matrix for the $k^{th}$ UT (step 302). The UT will perform singular value decomposition (SVD) in step 304 as:

$$H_k = U_k S_k V_k^H \quad (7)$$

where $U_k$ denotes left singular vectors, $S_k$ is a diagonal matrix with singular values making up the diagonal, and $V_k$ denotes the right singular vectors.

It is proposed that the UT employ $U_k^H$ for receiver processing and inform the BS of the following estimated channel (step 306):

$$\hat{H}_k = S_k V_k^H \quad (8)$$

Let the feedforward filter (computed by BS and passed to each UT) employed by $k^{th}$ UT be denoted by $F_k$ (step 308), which is a matrix of dimension $\{a_k \times L_k\}$ where $a_k$ denotes the length of vector $u_k$. Now, the baseband vector corresponding to the data for $k^{th}$ UT can be estimated as $$r_k = F_k U_k^H (HBx + n_k) \quad (9)$$

where x is the symbol vector derived from the input symbol vector u after the interference pre-cancellation step as shown in FIG. 1. The filter B indicates the power covariance matrix and the noise at the $k^{th}$ UT is denoted by $n_k$. The feedforward filter $F_k$ is strictly diagonal. In step 310, the receiver processing matrix is computed as $F_k U_k^H$. In step 312, the incoming data vector $r_k$ is processed to retrieve the transmitted baseband vector as $\tilde{x}_k = F_k U_k^H r_k$.

B. Transmitter Processing and Computation of GDFE Precoder Matrices

Figure 4:
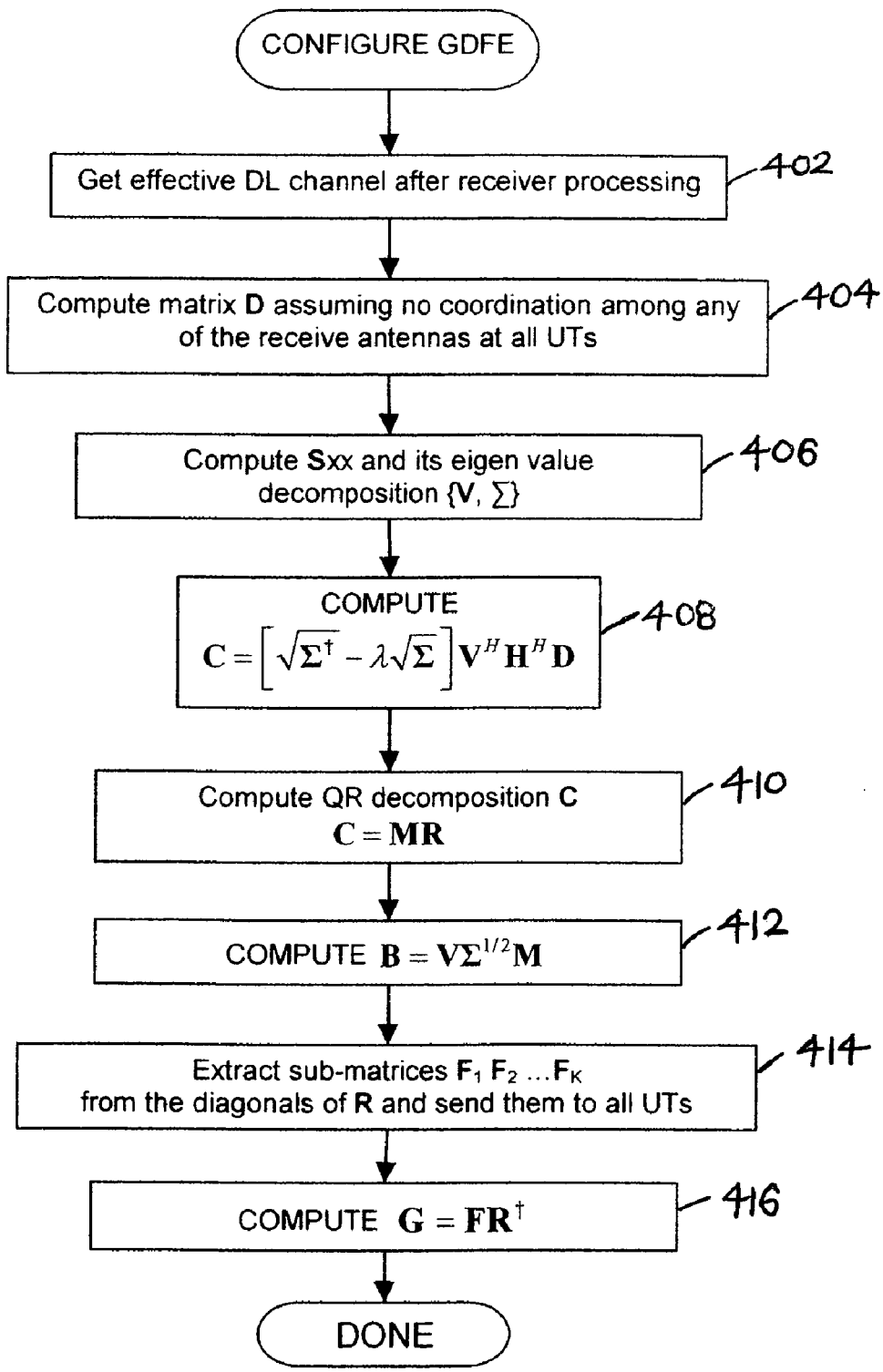
FIG. 4 is a flow diagram of GDFE precoder implementation according to an embodiment of the invention.

FIG. 4 is a flow diagram of GDFE precoder implementation. In step 402, the program gets the effective DL channel after receiver processing (see FIG. 3). The effective DL channel matrix can be represented as:

$$H = [\hat{H}_1^H, \hat{H}_1^H, \ldots, \hat{H}_k^H] \quad (10)$$

where $\hat{H}_k$ is a sub-matrix that corresponds to the effective DL channel for the $k^{th}$ UT as given in (8). In step 404, we compute the optimal Uplink Covariance Matrix, D, assuming there exist as many UTs as the number of the rows in the channel matrix H. This is a key condition and it implies that no coordination is assumed among any of the receiver antennas at all UTs. The algorithms in [6] or concurrently filed U.S. patent application Ser. No. 12/554,069, referenced above can be used to compute D. Here it must be noted that the imposed condition of "no coordination among receiver antennas" on D ensures that it is a strictly diagonal matrix.

In step 406, we compute the corresponding Input Covariance Matrix for the DL channel ($S_{xx}$). The reference [7] provides the following relation between input covariance matrices of the UL and corresponding DL channels as:

$$S_{xx} = V \Sigma V^H = \frac{I - [H_{DL}^H D H_{DL} + I]^{-1}}{\lambda} \quad (11)$$

where, $\lambda$ denotes the UL/DL duality variable as defined in [7] and can be computed as $$\lambda = \text{trace}(I - [H_{DL}^H D H_{DL} + I]^{-1})/P_t \quad (12)$$

In step 408, we follow the development in U.S. patent application Ser. No. 12/401,711 to compute the filter matrix C:

$$C = [\sqrt{\Sigma^\dagger} - \lambda\sqrt{\Sigma}]V^H H^H D \quad (13)$$

In step 410, let C=MR denote the QR decomposition (QRD) of C, where M is unitary matrix and R is an upper right triangular matrix. Now various GDFE related matrices (transmit filter B, feedback filter G, and feedforward filter F) can be computed as follows. In step 412, the program computes the transmit filter B $$B = V\Sigma^{1/2}M \quad (14)$$

In step 414, we extract sub-matrices $F_1, F_2, \ldots, F_K$ from the diagonals of R and send them to all the UTs.

$$F = \text{Diagonal}(R). \quad (15)$$

In step 416, the program computes the feedback matrix G $$G = FR^\dagger \quad (16)$$

where the superscript † denotes the Moore-Penrose Generalized Inverse.

The BS informs each UT of the corresponding submatrices $F_1, F_2, \ldots, F_K$ required for receiver processing.

C. Numerical Example

The following numerical example illustrates the computation of various matrices involved in the design of GDFE precoder of the present invention. Consider a BS with 4 antennas and 2 users with 2 antennas each, so that the channel matrices associated with both of the users are of dimension 2×4. The transmit power is assumed to be 20. For the sake of simplicity, we consider a real channel as follows:

$$H = \begin{bmatrix} H_1 \\ H_2 \end{bmatrix} = \begin{bmatrix} 0.8861 & 0.3159 & -0.3873 & 0.0470 \\ 0.3418 & 0.5586 & 1.1395 & -1.5820 \\ 1.6312 & -0.1095 & -1.3211 & 0.0545 \\ 1.1802 & -1.3143 & 0.5873 & 1.2575 \end{bmatrix} \quad (17)$$

Next, we compute the SVD decomposition of $H_1$ and $H_2$ as follows $$H_1 = \underbrace{\begin{bmatrix} -0.0113 & 0.9999 \\ 0.9999 & 0.0113 \end{bmatrix}}_{U_1} \underbrace{\begin{bmatrix} 2.0568 & 0 & 0 & 0 \\ 0 & 1.0182 & 0 & 0 \end{bmatrix}}_{S_1} \quad (18)$$

$$\underbrace{\begin{bmatrix} 0.1613 & 0.8740 & 0.4407 & -0.1260 \\ 0.2698 & 0.3164 & -0.5113 & 0.7521 \\ 0.5561 & -0.3676 & 0.6365 & 0.3879 \\ -0.7694 & 0.0285 & 0.3731 & 0.5177 \end{bmatrix}^H}_{V_1^H}$$

and, $$H_2 = \underbrace{\begin{bmatrix} -0.6229 & -0.7823 \\ -0.7823 & 0.6229 \end{bmatrix}}_{U_2} \underbrace{\begin{bmatrix} 2.4761 & 0 & 0 & 0 \\ 0 & 1.8267 & 0 & 0 \end{bmatrix}}_{S_2} \quad (19)$$

$$\underbrace{\begin{bmatrix} -0.7832 & -0.2961 & 0.5332 & -0.1208 \\ 0.4428 & -0.4013 & 0.5580 & 0.5757 \\ 0.1468 & 0.7660 & 0.6039 & -0.1642 \\ -0.4110 & 0.4055 & -0.1992 & 0.7918 \end{bmatrix}^H}_{V_2^H}$$

Now, the effective channels after the proposed receiver processing by $U_k^H$ for the two users are $$\hat{H}_1 = U_1^H H_1 = \begin{bmatrix} 0.3317 & 0.5550 & 1.1438 & -1.5824 \\ 0.8899 & 0.3222 & -0.3743 & 0.0290 \end{bmatrix} \quad (20)$$

and, $$\hat{H}_2 = U_2^H H_2 = \begin{bmatrix} -1.9393 & 1.0964 & 0.3634 & -1.0177 \\ -0.5409 & -0.7331 & 1.3993 & 0.7407 \end{bmatrix} \quad (21)$$

Thus, the overall effective downlink channel is given by $$\hat{H} = [\hat{H}_1^H, \hat{H}_2^H]^H = \begin{bmatrix} 0.3317 & 0.5550 & 1.1438 & -1.5824 \\ 0.8899 & 0.3222 & -0.3743 & 0.0290 \\ -1.9393 & 1.0964 & 0.3634 & -1.0177 \\ -0.5409 & -0.7331 & 1.3993 & 0.7407 \end{bmatrix} \quad (22)$$

Next, we compute the power covariance matrix D for the equivalent MAC channel assuming there exist as many UTs as the number of the rows in the effective channel matrix $\hat{H}$ (i.e., 4). The solution can be found using the algorithm in reference [6] which converges in four iterations $$D = \begin{bmatrix} 6.3049 & 0 & 0 & 0 \\ 0 & 1.2059 & 0 & 0 \\ 0 & 0 & 6.3225 & 0 \\ 0 & 0 & 0 & 6.1668 \end{bmatrix} \quad (23)$$

Now, for the given transmit power of 20, the optimal transmit power covariance matrix $S_{xx}$ can be computed using equation (11) as $$S_{xx} = \begin{bmatrix} 6.0853 & -0.9522 & -0.3370 & -0.5316 \\ -0.9522 & 2.9716 & -1.0238 & -2.2041 \\ -0.3370 & -1.0238 & 5.9656 & -0.6997 \\ -0.5316 & -2.2041 & -0.6997 & 4.9775 \end{bmatrix} \quad (24)$$

The Eigen Value Decomposition (EVD) $S_{xx} = V\Sigma V^H$ can be computed as $$V = \begin{bmatrix} -0.2175 & -0.5482 & 0.5784 & 0.5636 \\ -0.7942 & 0.4463 & 0.3448 & -0.2263 \\ -0.2491 & 0.3330 & -0.5111 & 0.7522 \\ -0.5098 & -0.6241 & -0.5342 & -0.2555 \end{bmatrix} \quad (25)$$

and $$\Sigma = \begin{bmatrix} 0.9750 & 0 & 0 & 0 \\ 0 & 6.4599 & 0 & 0 \\ 0 & 0 & 6.3064 & 0 \\ 0 & 0 & 0 & 6.2587 \end{bmatrix} \quad (26)$$

Next, we compute the matrix C and its QR Decomposition as $$C = [\sqrt{\Sigma^\dagger} - \lambda\sqrt{\Sigma}\,]V^H \hat{H}^H D = \quad (27)$$

$$\begin{bmatrix} 0.0483 & -0.3861 & -0.1131 & -0.1400 \\ 0.0742 & -0.0048 & 0.1198 & -0.0014 \\ 0.0713 & 0.0170 & -0.0429 & -0.1817 \\ 0.1716 & 0.0035 & -0.1048 & 0.0917 \end{bmatrix}$$

$$C = \underbrace{\begin{bmatrix} 0.2346 & -0.9712 & -0.0215 & -0.0366 \\ 0.3604 & 0.0670 & 0.9303 & -0.0146 \\ 0.3465 & 0.1217 & -0.1574 & -0.9167 \\ 0.8337 & 0.1938 & -0.3307 & 0.3976 \end{bmatrix}}_{M} \quad (28)$$

$$\underbrace{\begin{bmatrix} 0.2059 & -0.0836 & -0.0856 & -0.0198 \\ 0 & 0.3773 & 0.0923 & 0.1316 \\ 0 & 0 & 0.1552 & 0 \\ 0 & 0 & 0 & 0.2081 \end{bmatrix}}_{R}$$

Now, the transmit filter B is computed as $$B = V\Sigma^{1/2}M = \begin{bmatrix} 1.1264 & 0.5652 & -1.9863 & -0.7427 \\ 0.0529 & 0.8334 & 1.1229 & -1.0067 \\ 1.3715 & 0.5040 & 0.3722 & 1.9215 \\ -1.6874 & 0.0954 & -1.0424 & 1.0171 \end{bmatrix} \quad (29)$$

The effective feedforward filter can be computed as $$F = \begin{bmatrix} F_1 & 0 \\ 0 & F_2 \end{bmatrix} = \mathrm{diag}(R) = \begin{bmatrix} 0.2059 & 0 & 0 & 0 \\ 0 & 0.3773 & 0 & 0 \\ 0 & 0 & 0.1552 & 0 \\ 0 & 0 & 0 & 0.2081 \end{bmatrix} \quad (30)$$

Therefore, the two users employ the following feedforward filters for baseband signal processing $$F_1 = \begin{bmatrix} 0.2059 & 0 \\ 0 & 0.3773 \end{bmatrix}, \quad (31)$$

$$F_2 = \begin{bmatrix} 0.1552 & 0 \\ 0 & 0.2081 \end{bmatrix}$$

The interference pre-cancellation matrix G can be computed as $$G = FR^{-1} = \begin{bmatrix} 1 & 0.2214 & 0.4199 & -0.0446 \\ 0 & 1 & -0.5945 & -0.6321 \\ 0 & 0 & 1 & 0 \\ 0 & 0 & 0 & 1 \end{bmatrix} \quad (32)$$

D. Wireless Transmission System

Figure 5:
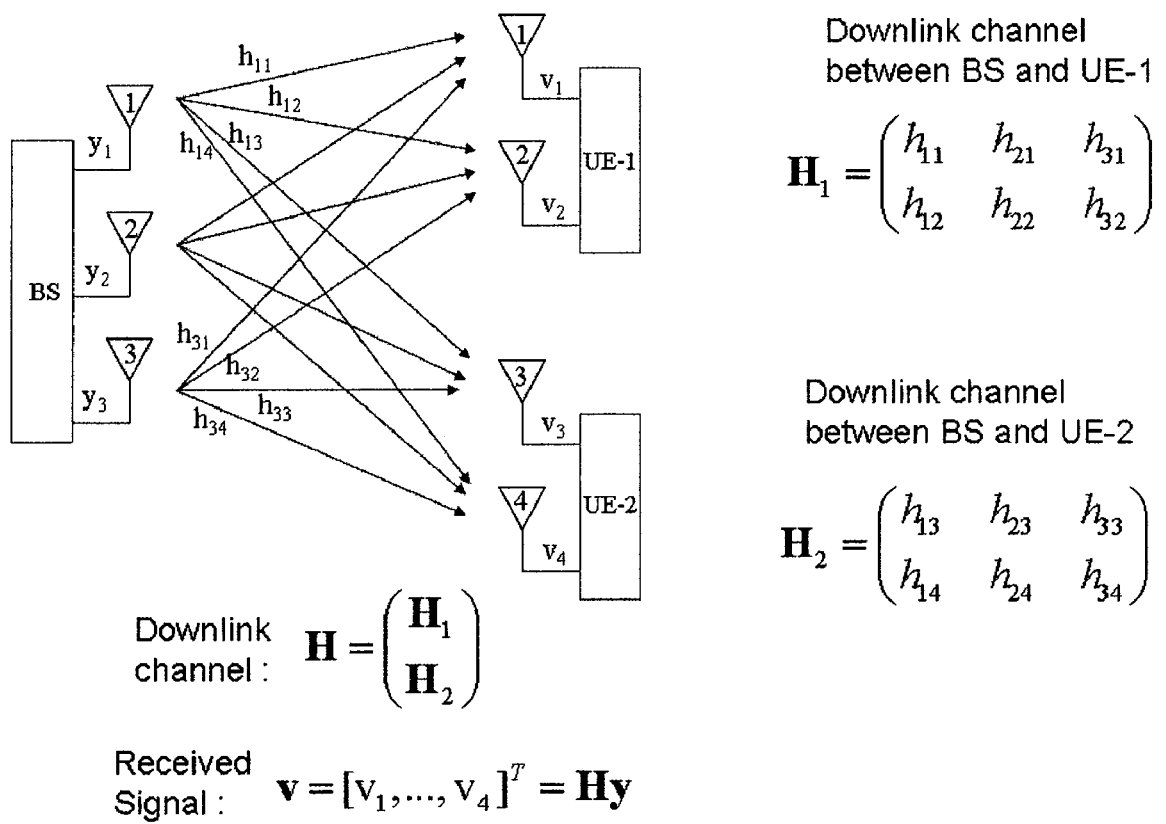
FIG. 5 is illustrates an example of a multi-user multiple-input multiple-output (MU-MIMO) wireless system showing a downlink channel representation of a multi-antenna base station (BS) and multiple user terminals (UEs) according to an embodiment of the invention.

FIG. 5 is illustrates an example of a multi-user multiple-input multiple-output (MU-MIMO) wireless system showing a downlink channel representation of a multi-antenna base station (BS) and multiple user terminals (UEs) according to an embodiment of the invention.

D.1 Channel Matrix Definition

The downlink channel between a base station (BS) and several user terminals (UEs) is normally represented as a matrix H whose number of rows equals to the sum of antennas at the UEs and number of columns is the same as the number of transmit antennas at the BS. The $(i,j)^{th}$ entry represents the complex channel gain $h_{ij}$ between the $i^{th}$ transmit antenna and $j^{th}$ receive antenna as shown in FIG. 5. In particular, complex channel gain $h_{ij}$ represents the amplification (or attenuation) that a transmitted signal undergoes in the wireless channel.

D.2 Channel Matrix Estimation

In a Frequency Division Duplex (FDD) system such as OFDMA, the complex channel gain $h_{ij}$ is usually estimated at the UE end. The channel estimation process is as follows. First, at the BS, antenna #1 transmits a reference signal. All the UEs estimate the received signal at each receiver antenna. As the reference signal is known to all UEs, the channel gain corresponding to the $1^{st}$ transmit antenna can be determined (assuming noise level is sufficiently below the reference signal power). This procedure is then repeated for transmit antennas number 2 to $N_t$.

In this way, the channel matrix $H_k$ corresponding to the $k^{th}$ UE can be estimated. Afterwards, all the UEs report back their respective channels to the BS using a dedicated feedback channel. The BS can then coalesce individual channel matrices to obtain the overall channel matrix H.

In Time Division Duplex (TDD) systems, the channel matrix can be estimated at the BS exploiting channel reciprocity property (i.e., UL and DL channels are related by some mathematical expression). For such systems, at a given time, one of the UEs will transmit a reference signal using a given antenna. This signal is captured by all the antennas at the BS and thus the corresponding channel gains are known. This process is repeated by all the UEs for all the available antennas, resulting in the estimate of complete Uplink channel matrix. The BS can then use some mathematical transformation (such as complex conjugation) to obtain equivalent downlink channel.

D.3 Information Flow from Base Station to User Terminals

Figure 6:
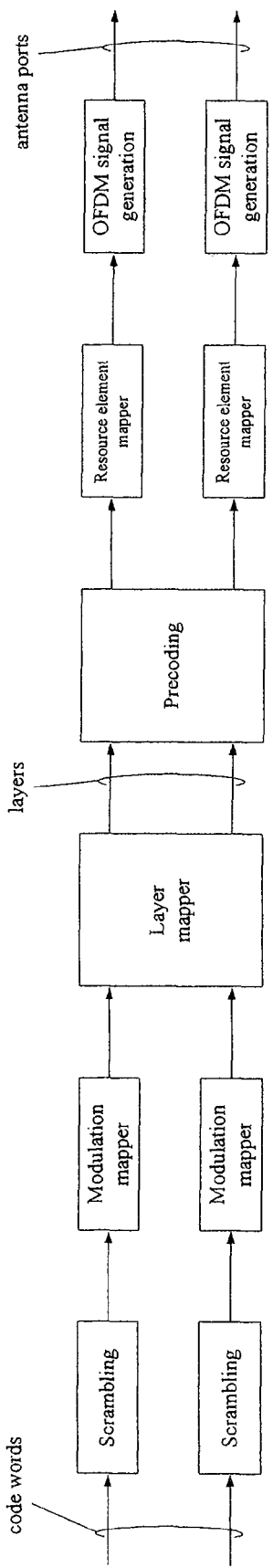
FIG. 6 illustrates an example of a communication block diagram for the downlink information flow at the base station of FIG. 5.

FIG. 6 illustrates an example of a communication block diagram for the downlink information flow at the base station of FIG. 5. The information to be sent to different UEs is represented by different codewords (one or more codewords can be assigned to a single UE). The bits in a given codeword are then scrambled using a predetermined scrambling code (Scrambling block) which is known both at the BS and UEs. The scrambled bits are then mapped (Modulation Mapper block) to a complex modulation symbol (e.g., BPSK, QPSK, QAM, etc.). These information symbols are then mapped (Layer Mapper block) to Layers (a stream of complex symbols) as shown in FIG. 6. The number of Layers is usually less than or equal to the rank of the channel matrix H. The information symbols mapped to different Layers are then processed in a Precoding block (which implements GDFE or THP etc). The precoded symbols are then mapped to resource elements within a Resource Element Mapper block (which is a rectangular grid of OFDM tones and time slots). These symbols are then fed to an OFDM Signal Generator and the output is mapped to the transmit antenna ports.

The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for GDFE precoder configuration in MIMO systems and matrix calculations with receiver beamforming. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method for processing user symbols with a generalized decision feedback equalizer (GDFE) based precoder in a base station of a multi-user multiple-input multiple-output (MU-MIMO) wireless system having K user terminals (UTs) which communicate with the base station via an uplink (UL) channel and a corresponding downlink (DL) channel, the method comprising:

a processor obtaining an effective downlink (DL) channel matrix H for the DL channel after receiver processing at the user terminals;

computing an uplink (UL) covariance matrix D by assuming there are as many user terminals as a number of rows in the effective DL channel matrix H, the UL covariance matrix D being a diagonal matrix;

computing a filter matrix C based on the UL covariance matrix D;

computing a feedforward filter matrix F based on the filter matrix C;

computing an interference pre-cancellation matrix G, based on the feedforward filter matrix F and the filter matrix C, used in a transmitter at an interference pre-cancellation stage of the GDFE precoder; and processing by the processor user symbols by a decision feedback equalizing stage of the GDFE precoder to produce filtered vector symbols;

wherein the effective downlink (DL) channel matrix is H=

$H = [\hat{H}_1^H, \hat{H}_1^H, \ldots, \hat{H}_K^H]$, where $\hat{H}_k$ is an effective DL channel sub-matrix for the $k^{th}$ UT $\hat{H}_k = S_k V_k^H$, where $S_k$ and $V_k$ are matrices obtained from a singular value decomposition (SVD) of and estimated DL channel matrix $H_k$ for the $k^{th}$ UT $H_k = U_k S_k V_k^H$.

2. The method of claim 1, wherein $U_k^H$ is used for receiver processing at the $k^{th}$ UT and the effective DL channel sub-matrix for the $k^{th}$ UT, $\hat{H}_k$, is provided to the base station by the $k^{th}$ UT.

3. The method of claim 1, wherein $C = [\sqrt{\Sigma^\dagger} - \lambda\sqrt{\Sigma}]V^H H^H D$, where superscript † denotes a Moore-Penrose Generalized Inverse, and where V is a unitary matrix and $\Sigma$ is a diagonal matrix with non-negative entries in an Eigen Value Decomposition (EVD) of an input covariance matrix $S_{xx}$ represented as $S_{xx} = V \Sigma V^H$, and $\lambda$ is a UL/DL duality variable for a given total transmit power $P_t$, $\lambda = \mathrm{trace}(I - [H_{DL}^H D H_{DL} + I]^{-1})/P_t$, where V is a unitary matrix and $\Sigma$ is a diagonal matrix with non-negative entries, and the input covariance matrix $S_{xx}$ is computed as $$S_{xx} = V\Sigma V^H = \frac{I - [H_{DL}^H D H_{DL} + I]^{-1}}{\lambda}.$$

4. The method of claim 3, wherein C=MR denotes QR decomposition (QRD) of C, M being a unitary matrix, and R being an upper right triangular matrix;

wherein the feedforward filter matrix F is $F = \mathrm{Diagonal}(R)$; and wherein the interference pre-cancellation matrix G is $G = FR^\dagger$, where superscript † denotes a Moore-Penrose Generalized Inverse.

5. The method of claim 4, further comprising:
computing a transmit filter matrix B for a transmit filter $B = V\Sigma^{1/2}M;$ passing the filtered vector symbols through the transmit filter to produce an output of transmitted signals;
directing the output of the transmit filter to the channel represented by the effective DL channel matrix H through which communications occur in the wireless system with the user terminals.

6. The method of claim 1, wherein processing user symbols by a decision feedback equalizing stage of the GDFE precoder to produce filtered vector symbols comprises:
directing the user symbols through a modulo unit disposed in a feedforward path to produce the filtered vector symbols which are fed back through an interference pre-cancellation block disposed in a feedback path, the interference pre-cancellation block being denoted by I-G; and
subtracting an output signal of the interference pre-cancellation block from the user symbols which are applied to the modulo unit in the feedforward path.

7. A generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the GDFE precoder comprising:
a processor for calculating;
a feedforward path;
a feedback path; and
an interference pre-cancellation block denoted by I-G disposed in the feedback path, I being an identity matrix, G being an interference pre-cancellation matrix;
wherein the interference pre-cancellation matrix G is computed based on a feedforward filter matrix F and a filter matrix C, the feedforward filter matrix F is computed based on the filter matrix C, the filter matrix C is computed based on an uplink (UL) covariance matrix D, the UL covariance matrix D is computed by assuming there are as many user terminals as a number of rows in an effective downlink (DL) channel matrix H, the UL covariance matrix D is a diagonal matrix, and the effective DL channel matrix H is obtained after receiver processing at the user terminals;
wherein the effective downlink (DL) channel matrix is $H = [\hat{H}_1^H, \hat{H}_2^H, \ldots, \hat{H}_K^H]$ where $\hat{H}_k$ is an effective DL channel sub-matrix for the $k^{th}$ UT $\hat{H}_k = S_k V_k^H,$ where $S_k$ and $V_k$ are matrices obtained from a singular value decomposition (SVD) of and estimated DL channel matrix $H_k$ for the $k^{th}$ UT $H_k = U_k S_k V_k^H.$ 8. The GDFE precoder of claim 7, wherein $U_k^H$ is used for receiver processing at the $k^{th}$ UT and the effective DL channel sub-matrix for the $k^{th}$ UT, $\hat{H}_k$, is provided to the base station by the $k^{th}$ UT.

9. The GDFE precoder of claim 7, wherein $C = [\sqrt{\Sigma^\dagger} - \lambda\sqrt{\Sigma}]V^H H^H D,$ where superscript † denotes a Moore-Penrose Generalized Inverse, and where V is a unitary matrix and $\Sigma$ is a diagonal matrix with non-negative entries in an Eigen Value Decomposition (EVD) of an input covariance matrix $S_{xx}$ represented as $S_{xx} = V\Sigma V^H,$ and $\lambda$ is a UL/DL duality variable for a given total transmit power $P_t,$ $\lambda = \text{trace}(I - [H_{DL}^H D H_{DL} + I]^{-1})/P_t,$ where V is a unitary matrix and $\Sigma$ is a diagonal matrix with non-negative entries, and the input covariance matrix $S_{xx}$ is computed as $$S_{xx} = V\Sigma V^H = \frac{I - [H_{DL}^H D H_{DL} + I]^{-1}}{\lambda}.$$

10. The GDFE precoder of claim 9,
wherein C=MR denotes QR decomposition (QRD) of C, M being a unitary matrix, and R being an upper right triangular matrix;
wherein the feedforward filter matrix F is $F = \text{Diagonal}(R);$ and wherein the interference pre-cancellation matrix G is $G = FR^\dagger,$ where superscript † denotes a Moore-Penrose Generalized Inverse.

11. The GDFE precoder of claim 7, further comprising:
a modulo unit disposed in the feedforward path to produce a stream of filtered vector symbols X which are fed back through the interference pre-cancellation block disposed in the feedback path.

12. The GDFE precoder of claim 11,
wherein an output signal of the interference pre-cancellation block is subtracted from a stream of user symbols and applied to the modulo unit in the feedforward path.

13. The GDFE precoder of claim 12, further comprising:
a transmit filter represented by the transmit filter matrix B for filtering the stream of filtered vector symbols X produced by the modulo unit disposed in the feedforward path;
wherein the transmit filter matrix B is $B = V\Sigma^{1/2}M.$ 14. A MU-MIMO wireless system comprising:
a base station including the GDFE precoder of claim 13;
a plurality of K user terminals; and
a channel, represented by the DL channel matrix H through which communications occur in the wireless system with the user terminals, to receive an output of the transmit filter.

15. A generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the GDFE precoder comprising:
a decision feedback equalizing stage for processing, by a processor, user symbols to produce filtered vector symbols, the decision feedback equalizing stage including an interference pre-cancellation stage having an interference pre-cancellation matrix G used in a transmitter at the interference pre-cancellation stage; and a transmit filter represented by a transmit filter matrix B for processing the filtered vector symbols after the decision feedback equalizing stage to produce an output of transmitted signals to be directed to the DL channel represented by the effective DL channel matrix H through which communications occur in the wireless system with the user terminals;

wherein the interference pre-cancellation matrix G is computed based on a feedforward filter matrix F and a filter matrix C, the feedforward filter matrix F is computed based on the filter matrix C, the filter matrix C is computed based on an uplink (UL) covariance matrix D, the UL covariance matrix D is computed by assuming there are as many user terminals as a number of rows in an effective downlink (DL) channel matrix H, the UL covariance matrix D is a diagonal matrix, and the effective DL channel matrix H is obtained after receiver processing at the user terminals;

wherein the effective downlink (DL) channel matrix is $$H=[\hat{H}_1^H, \hat{H}_2^H, \ldots, \hat{H}_K^H]$$

where $\hat{H}_k$ is an effective DL channel sub-matrix for the $k^{th}$ UT $$\hat{H}_k = S_k V_k^H,$$

where $S_k$ and $V_k$ are matrices obtained from a singular value decomposition (SVD) of and estimated DL channel matrix $H_k$ for the $k^{th}$ UT $$H_k = U_k S_k V_k^H.$$

16. The GDFE precoder of claim 15, wherein $U_k^H$ is used for receiver processing at the $k^{th}$ UT and the effective DL channel sub-matrix for the $k^{th}$ UT, $\hat{H}_k$, is provided to the base station by the $k^{th}$ UT.

17. The GDFE precoder of claim 15, wherein $$C=[\sqrt{\Sigma^\dagger}-\lambda\sqrt{\Sigma}]V^H H^H D,$$

where superscript † denotes a Moore-Penrose Generalized Inverse, and where V is a unitary matrix and $\Sigma$ is a diagonal matrix with non-negative entries in an Eigen Value Decomposition (EVD) of an input covariance matrix $S_{xx}$ represented as $$S_{xx} = V \Sigma V^H,$$

and $\lambda$ is a UL/DL duality variable for a given total transmit power $P_t$, $$\lambda = \text{trace}(I - [H_{DL}^H D H_{DL} + I]^{-1})/P_t,$$

where V is a unitary matrix and $\Sigma$ is a diagonal matrix with non-negative entries, and the input covariance matrix $S_{xx}$ is computed as $$S_{xx} = V \Sigma V^H = \frac{I - [H_{DL}^H D H_{DL} + I]^{-1}}{\lambda}.$$

18. The GDFE precoder of claim 17,
wherein C=MR denotes QR decomposition (QRD) of C, M being a unitary matrix, and R being an upper right triangular matrix;
wherein the feedforward filter matrix F is $$F = \text{Diagonal}(R); \text{ and}$$

wherein the interference pre-cancellation matrix G is $$G = FR^\dagger,$$

where superscript † denotes a Moore-Penrose Generalized Inverse.

19. The GDFE precoder of claim 15,
wherein the decision feedback equalizing stage includes a modulo unit disposed in a feedforward path to produce a stream of filtered vector symbols X which are fed back through an interference pre-cancellation block disposed in a feedback path, the interference pre-cancellation block denoted by I-G disposed in the feedback path, wherein an output signal of the interference pre-cancellation block is subtracted from a stream of user symbols and applied to the modulo unit in the feedforward path.

20. A MU-MIMO wireless system comprising:
a base station including the GDFE precoder of claim 15;
a plurality of K user terminals; and
a channel, represented by the effective DL channel matrix H through which communications occur in the wireless system with the user terminals, to receive the output of the transmit filter.

* * * * *